United States Patent [19]

Mori et al.

[11] Patent Number: 5,243,600
[45] Date of Patent: Sep. 7, 1993

[54] TIME-DIVISION MULTIPLEXING APPARATUS

[75] Inventors: Takako Mori, Odawara; Kazuhiko Ide, Kawasaki, both of Japan

[73] Assignee: Kabushiki Kaisha Toshiba, Kawasaki, Japan

[21] Appl. No.: 744,352

[22] Filed: Aug. 13, 1991

[30] Foreign Application Priority Data

Aug. 20, 1990 [JP] Japan .................................. 2-217223

[51] Int. Cl.$^5$ .............................................. H04J 3/04
[52] U.S. Cl. ...................................................... 370/112
[58] Field of Search .................... 370/112, 77, 99, 56, 370/53, 84, 58.1

[56] References Cited

U.S. PATENT DOCUMENTS

| | | | |
|---|---|---|---|
| 3,614,327 | 10/1971 | Low .................................... | 370/112 |
| 3,749,839 | 7/1973 | Fornasiero et al. ........... | 179/15 BA |
| 3,763,318 | 10/1973 | Ross et al. ........................ | 370/112 |
| 5,050,167 | 9/1991 | Izadpanah ........................ | 370/112 |
| 5,056,087 | 10/1991 | Ferguson .......................... | 370/112 |
| 5,128,940 | 7/1992 | Wakimoto .......................... | 370/112 |

OTHER PUBLICATIONS

National Conference Record, 1986 Communications; The Institute of Electronics and Communications Engineers of Japan, No. 162; W. Yamanaka, M. Hirata, M. Suzuki; "High-Speed Serial to Parallel Converter".
Patent Abstracts of Japan, vol. 7, No. 87 (P-190), Apr. 9, 1983, & JP-A-58-014-232, Jan. 27, 1983, Y. Hibi, "Input and Output Controlling System".
Patent Abstracts of Japan, vol. 7, No. 36 (E-158) (1181), Feb. 15, 1983, & JP-A-57-188-153, Nov. 19, 1982, F. Uekawa, et al., "Serial Parallel Conversation Multiplex Circuit".

*Primary Examiner*—Douglas W. Olms
*Assistant Examiner*—Shick Hom
*Attorney, Agent, or Firm*—Oblon, Spivak, McClelland, Maier & Neustadt

[57] ABSTRACT

A time-division multiplexing apparatus time-division multiplexes, in units of m bits, each bit of n-channel digital signals (n is a natural number more than 2), transmitted in a serial manner in synchronous to transmission clock pulses of a frequency of f0, by using m channels (m is a natural number smaller than n). Serial signals supplied to n channels are respectively converted into m-bit signals by shift register blocks provided for the n channels. The same bit outputs of the blocks are supplied, as an n-bit signal, to corresponding one of latch blocks, and are latched in synchronous to latch pulses of a frequency of 1/m of f0. The outputs of the latch blocks are input to n : 1 selector blocks. One of the bit signals of the selector blocks is selectively output in accordance with gate pulses.

10 Claims, 5 Drawing Sheets

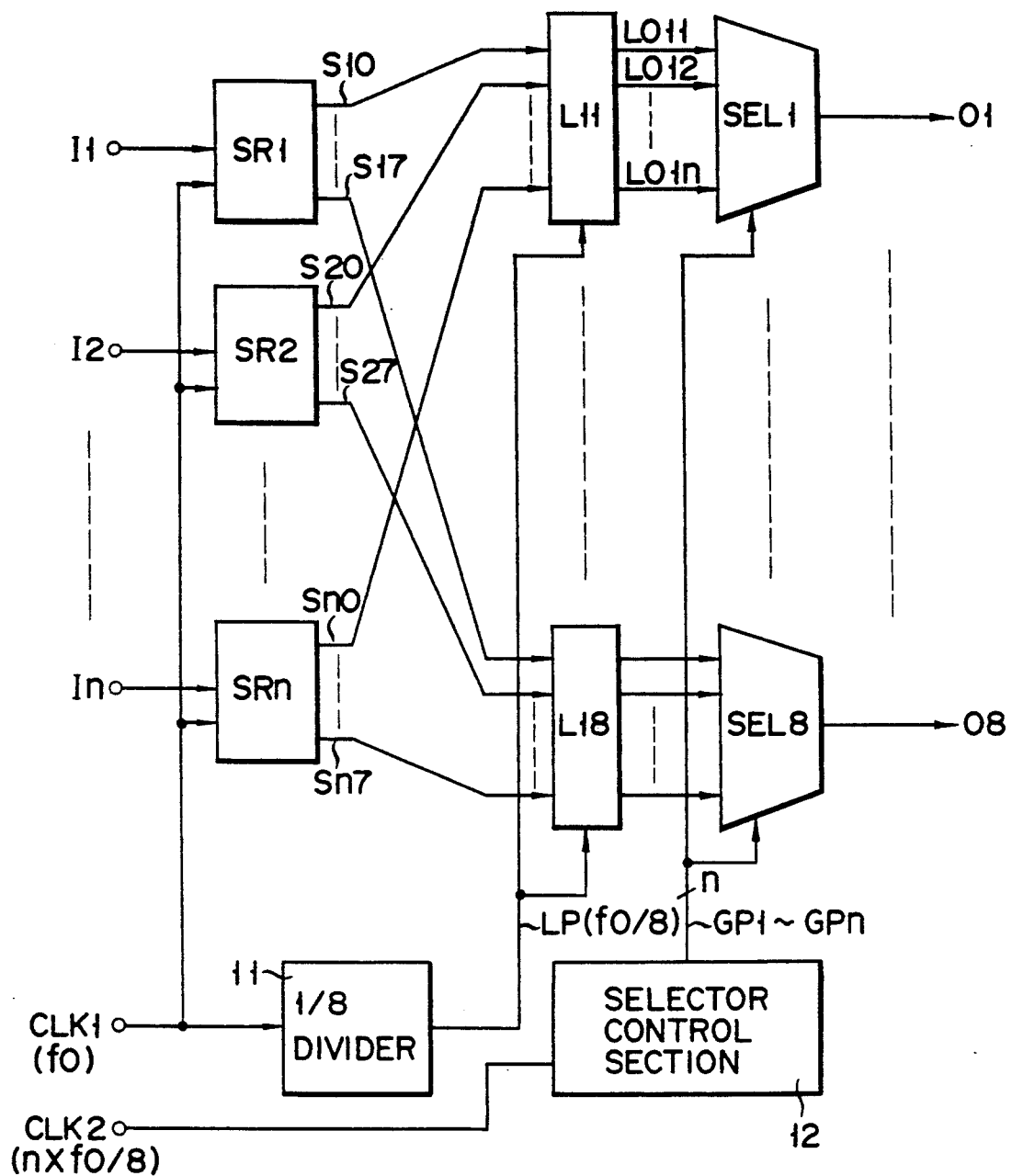
F I G. 5

TIME-DIVISION MULTIPLEXING APPARATUS

BACKGROUND OF THE INVENTION

1. Field of the Invention

This invention relates to a time-division multiplexing apparatus for time-division multiplexing each bit of channels of m-bit byte serial digital input signals to m-bit byte parallel digital signals;

2. Description of the Related Art

In general, an apparatus for time-division multiplexing n channels of m-bit byte serial digital signals; is constructed as shown in FIG. 1. In this multiplexing apparatus, each bit of signals I1–In (n is a natural number more than m) input in synchronous to a transmission clock frequency of f0 is time-division multiplexed to 8-bit byte parallel digital signals (i.e., m=8). Specifically, in the apparatus, the signals (8-bit byte serial digital signals input in synchronous to clock pulses CLK1 of a frequency f0) I1–In are supplied to 8-stage shift registers SR1–SRn, respectively. The shift registers SR1–SRn each operate in synchronous to clock pulses CLK1. The 8-bit outputs of the registers SR1–SRn are supplied to 8-bit D latches L31–L3n, respectively Clock pulses, whose frequency is ⅛ of that of the clock pulses CLK1, obtained by dividing the clock pulses CLK1 by means of a ⅛ divider 31, are used as latch pulses LP for determining respective latch time points of the D latches L31–L3n.

In FIG. 1, the outputs of the bits of the D latches L31–L3n are denoted by L010–L017, L021–L027, ..., L0n0–L0n7, in the order from the top, and are supplied to (n : 1) selectors SEL1–SEL8, respectively. A selector control section 32 generates gate pulses GP1–GPn for determining respective selection channels of the selectors SEL1–SEL8. Specifically, the control section 32 generates n-bit gate pulses GP1–GPn of a width 8/(n×f0) corresponding to each channel in synchronous to clock pulses CLK2 having a frequency of n×f0/8, and supplies them to the selectors SEL1–SELn. The selectors in turn perform multiplexing by using the gate pulses GP1–GPn.

FIG. 2 shows an example of multiplexing performed in the above-described apparatus, i.e. shows a procedure for obtaining an output 01 from the selector SEL1. In this figure, reference codes S10, S20, ..., SnO denote the outputs of the shift registers SR1, SR2, ..., SRn supplied with the n-channel signals I1, I2, ..., In, respectively, reference symbol LP a latch pulse (for latching each input signal at rising), reference codes L010, L020, ..., L0n0 the 0th-bit outputs of D latch L31, L32, ..., L3n, respectively, reference codes GP1, GP2, ..., GPn gate pulses for selecting 1, 2, ..., n channels, respectively, and reference code 01 the output of the selector SEL1.

In the above-described apparatus, the relationship between the 0th-bit output of each of the D latches L31–L3n and the rising and falling of the gate pulses GP1–GPn for the selectors SEL1–SEL8 is shown in FIG. 3. Similarly, FIG. 4 shows the relationship between the 7th-bit output of the latches and the rising and falling of the gate pulses. In these figures, reference codes L010–L0n0 denote the 0th-bit outputs of the D latches L31–L3n, reference codes L017–L0n7 the 7th-bit outputs, and GP1–GPn gate pulses supplied to the selectors SEL1–SEL8.

As is evident from FIGS. 3 and 4, the transmission time delay of the signal L0n0 is longer than that of the signal L010 between the D latches L31–L3n and selectors SEL1–SEL8 since the signal line for the signal L0n0 is longer than that for the signal L010, whereas the transmission time delay of the signal L017 is longer than that of the signal L0n7 since the signal line for the signal L017 is longer than that for the signal L0n7.

As is shown in FIG. 3, since there is a time period of 8 (n−1)/(n×f0) between the determination of the output LonO of the D latch L3n of the channel n and the generation of a gate pulse, the hatched signal to be multiplexed can be gated correctly, unless the transmission time delay is longer than the time period therebetween.

However, as is shown in FIG. 4, since the transmission time delay of the signal of the channel 1 is longer than that of the signal of the channel n in the case of the 7th-bit output, the determination point of the output L017 of the D latch L31 of the channel 1 will be retarded from the generation of the gate pulse GP1 by a selector control section 32, and hence the hatched signal to be multiplexed will not be able to be gated, if its transmission time delay exceeds the width 8/(n×f0) of the gate pulse.

As described above, in the conventional time-division multiplexing apparatus, signal lines arranged between the D latches and n : 1 selectors have different lengths, so that in the case of time-division multiplexing n-channel inputs to produce m-channel outputs, the transmission time delay of a signal transmitted through one of the signal lines inevitably differs from that of a signal transmitted through another line. In particular, if the transmission time delay exceeds m/(n×f0), correct multiplexing cannot be performed.

SUMMARY OF THE INVENTION

It is the object of the invention to provide a time-division multiplexing apparatus capable of performing correct multiplexing n channels of m-bit byte serial digital (m<n); inputs, supplied in synchronous to transmission clock pulses of a frequency of f0, to m-bit byte parallel digital outputs irrespective of variations in the transmission time delay which occurred when the but data of each input channel is distributed to each output channel if the time delay is less than 1/f0, thereby allowing relatively large variations in the time delay, hence enabling digital signals to be transmitted at high speed and also enabling multiplexing of signals of a large number of channels.

To attain the object, the time-division multiplexing apparatus for time-division multiplexing each bit of n-channel digital signals (n is a natural number more than 2), transmitted in a serial manner in synchronous to transmission clock pulses of a frequency of f0, by using m channels (m is a natural number smaller than n), the time-division multiplexing apparatus comprises:

a number n of 8 stage shift resistor blocks respectively provided for n channels, for converting serial input signals of the n channels into m-bit shift signals, respectively;

latch-pulse generating means for generating, as latch pulses, clock pulses whose frequency is 1/m of the frequency f0;

a number m of latch blocks for latching n-bit parallel input signals in synchronous to the latch pulses (LP), respectively;

first wiring means connecting the same bit output terminals of the n shift resistor blocks to n-bit parallel input terminals of corresponding one of the m latch blocks, respectively;

a number m of n : 1 selectors blocks provided for the m latch blocks, for receiving the n-bit parallel signals and selectively outputting one of them in accordance with gate pulses;

second wiring means connecting n-bit output terminals of the m latch blocks to n-bit input terminals of the n : 1 selector blocks, respectively; and gate pulse generating means for generating gate pulses in synchronous to clock pulses CLK to having a frequency of n×of/8 to cause the number m of n : 1 selector blocks to output n-bit inputs.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 5 is a circuit block diagram showing a timedivision multiplexing apparatus according to a first embodiment of the invention.

DETAILED DESCRIPTION OF THE PREFERRED EMBODIMENTS

Figure 1:
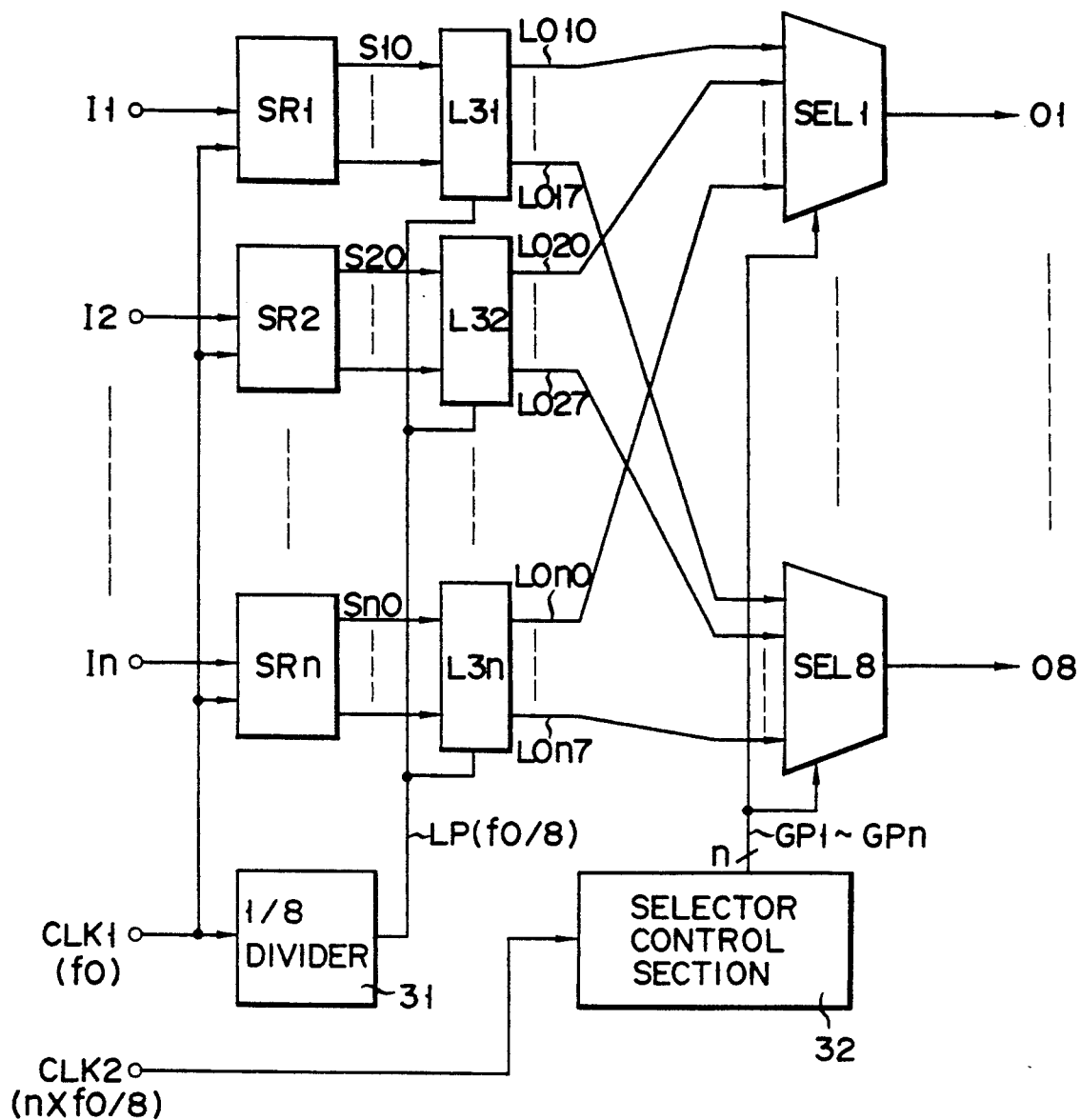
FIG. 1 is a circuit block diagram showing a conventional time-division multiplexing apparatus.
Figure 2:
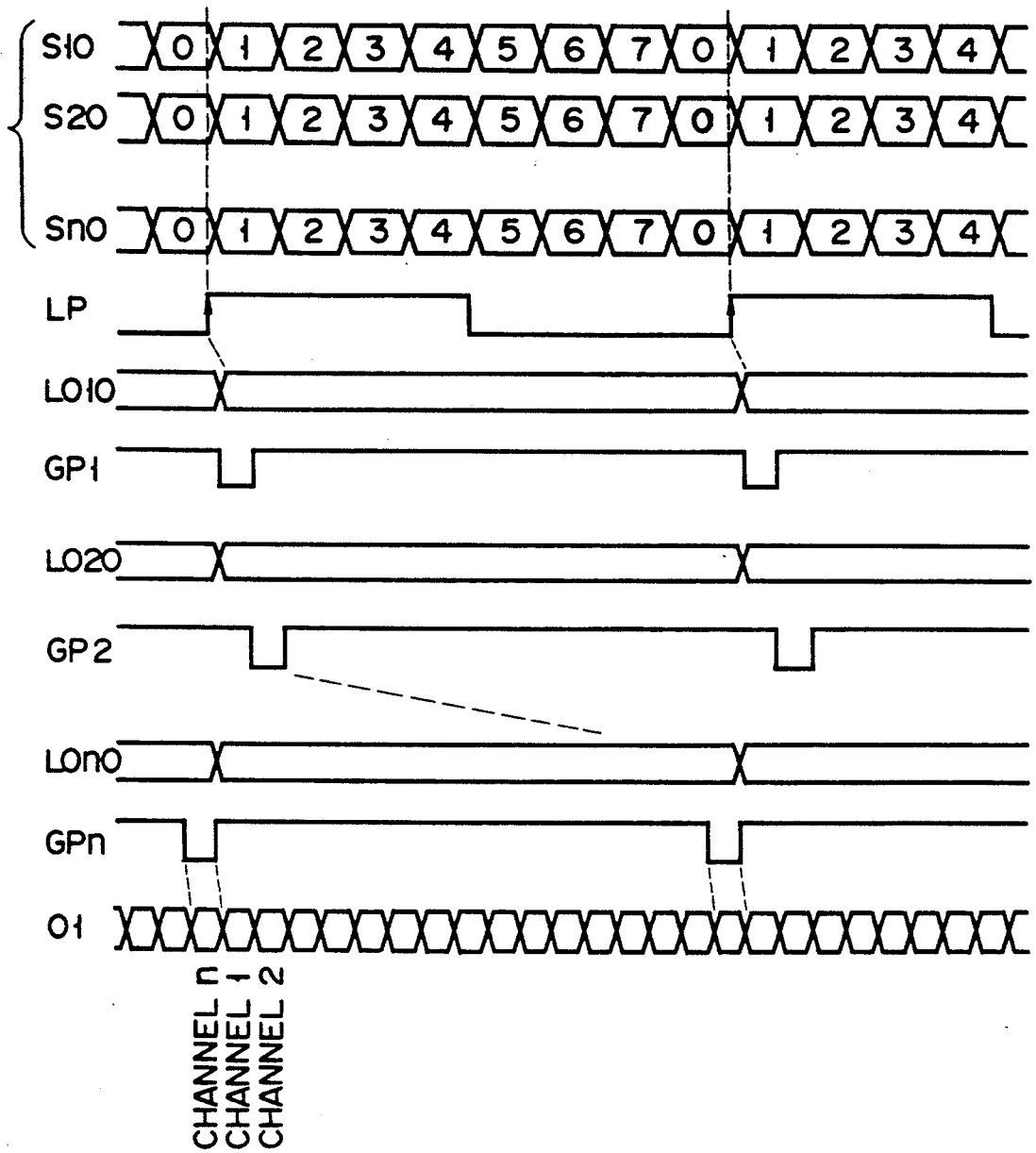
FIG. 2 is a timing chart showing the operation of the apparatus of FIG. 1.
Figure 3:
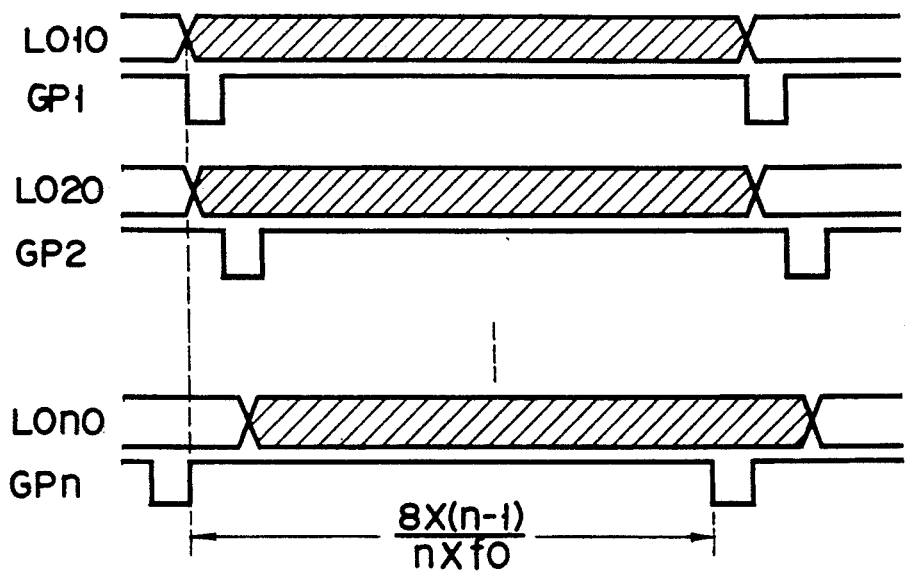
FIGS. 3 and 4 are timing charts useful in explaining the problems of the apparatus of FIG. 1.
Figure 4:
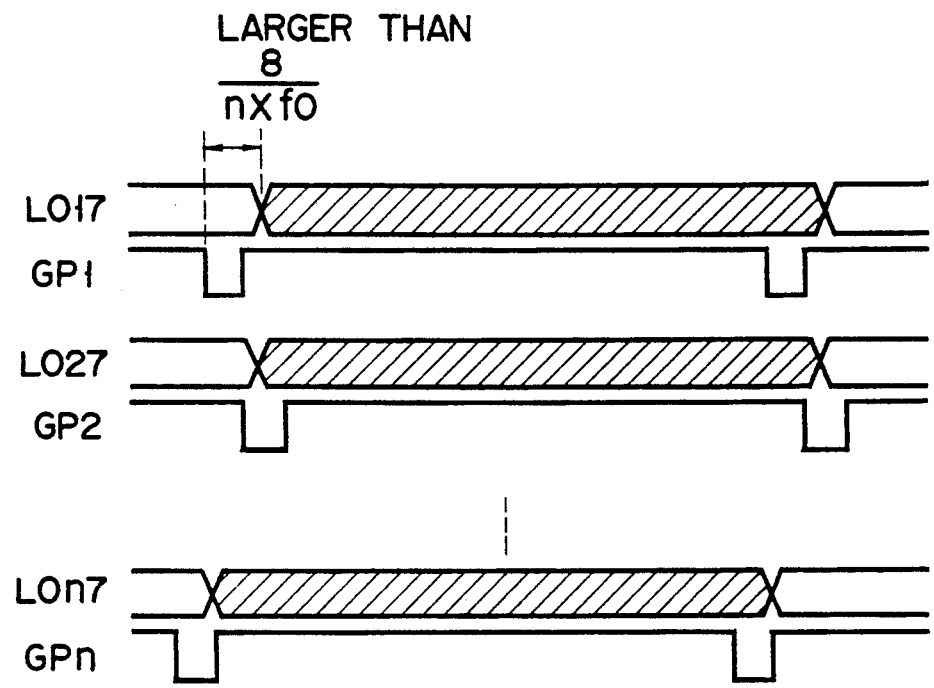
Figure 6:
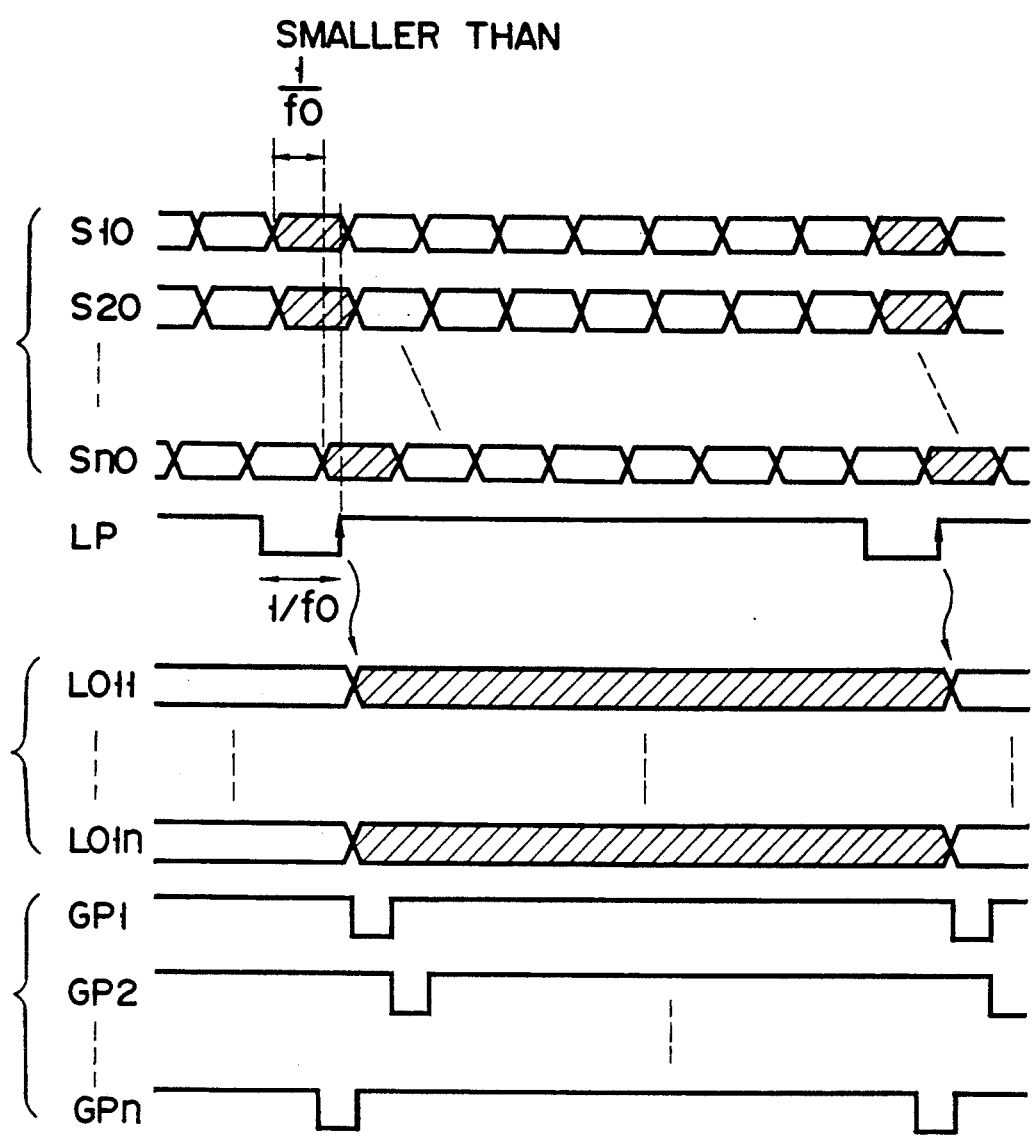
FIG. 6 is a timing chart showing the operation of the apparatus of FIG. 5.

The invention will be explained with reference to FIGS. 5 and 6 showing an embodiment thereof.

FIG. 5 shows an apparatus for time-division multiplexing of n channels of m-bit byte serial digital signals to 8-bit byte parallel digital signals (i.e., m=8). In this figure, n-channel input digital signals (i.e., serial digital signals of an 8-bit byte input in synchronous to clock pulses CLK1 of a frequency of f0) I1–In are supplied to the 8-stage shift registers SR1–SRn which operate in synchronous to the clock pulses CLK1. 8-bit outputs from the shift registers SR1–SRn are designated by reference codes S10–S17, S20–S27, . . . , Sn0–Sn7, respectively, in the order from the above in FIG. 5.

The outputs of the shift registers SR1–SRn are supplied to n-bit D latches L11–L18 provided for the respective bits of the shift registers. The 0th-bit output terminal of each of the shift registers is connected to the n-bit input terminal of the D latch L11, while the 1st-bit output terminal of each of the shift registers is connected to the n-bit input terminal of the D latch L12. Similarly, the 7th-bit output terminal o each of the shift registers is connected to the n-bit input terminal of the D latch L18. Clock pulses, whose frequency is ⅛ of that of the clock pulses CLK1, obtained by a ⅛ divider 11 are used as the latch pulses LP for setting the time points at which latching is performed by the D latches L11–L18. The n-bit outputs of the n-bit D latches L11–L18 are supplied to (n : 1) selectors SEL1–SEL8 provided corresponding to the D latches L11–L18. Gate pulses GP1–GPn for determining respective selection channels of the selectors SEL1–SEL8 are generated by a selector control section 12.

The control section 12 generates the gate pulses GP1–GPn of a width of 8/(n×f0) corresponding to respective channels, in synchronous to clock pulses CLK2 of a frequency of (n×f0)/8, and sequentially supplies the gate pulses to the selectors SEL1–SEL8. The selectors in turn perform multiplexing by using the gate pulses.

Then, the operation of the apparatus described as above will be explained with reference to FIG. 6.

FIG. 6 is a timing chart showing the relationship between the input and output signals of the D latch L11. In this figure, reference codes S10–Sn0 represent the respective 0th-bit outputs of the shift registers SR1–SRn, reference codes LO11–LO1n the outputs of the n-bit D latch 11, and reference codes GP1–GPn gate pulses.

As regards the 0th-bit output of each of the shift registers SR1–SRn, the transmission time delay of a signal of a channel n is longer than that of a signal of a channel 1 since the signal line for the former signal is longer than that for the latter signal. On the other hand, regarding the 7th-bit output of each register, the transmission time delay of the signal of the channel 1 is longer than that of the signal of the channel n since the signal line for the former signal is longer than that for the latter signal. The output signals S10–Sn0 of the registers SR1–SRn, however, have a width of 1/of. If the transmission time delay is shorter than the width, the latch pulse LP falls after the output Sn0 of the shift register SRn has been determined, as is shown in FIG. 6. Thus, the latch pulse LP can correctly latch the data (indicated by hatching) to be latched. The same may be said of the 1st- through 7th-bit outputs.

The wire length between each bit of the n-bit D latches L11–L18 and a corresponding one of the (n : 1) selectors SEL1–SEL8 is set at substantially the same value. Accordingly, in each shift register, differences in transmission time delay between the latch pulses LP do not exceed the width of the gate pulses GP1–GPn, and hence the apparatus of the invention is free from the conventional problem that part of the data to be multiplexed is gated before the entire data has reached.

As is described above, in the time-division multiplexing apparatus of the invention, the wire length between each bit of the n-bit D latches L11–L18 and a corresponding one of the (n : 1) selectors SEL1–SEL8 is set at substantially the same value, so that correct multiplexing can be performed in byte units only if variations in transmission time delay fall within a range of 1/f0 or less. Thus, in the case of n>8, relatively large variation in transmission time delay is allowable, which enables digital signals to be transmitted at high speed, and also enables a large number of channels to be incorporated.

Though m is 8 in the above-described embodiment, the invention is not limited to this, but may be any other numeral smaller than n.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A time-division multiplexing apparatus for receiving n channels (n is a natural number more than 2) with m-bit (m is a natural number more than 2) byte serial digital input signals, each signal being synchronous with a first clock of frequency f0, time-division multiplexing said received serial digital signals, and converting said multiplexed digital signals into m channels of n-bit byte serial digital signals in synchronism with a second clock of frequency (n/m)*f0, comprising:

n shift resister blocks each inputting a corresponding one of said serial digital input signals and each synchronous with the first clock so as to output said serial digital input signal in parallel as shift data over a plurality of outputs of each shift register;

a latch pulse generating block for generating latch pulses of frequency f0/m;

m latch blocks having n data inputs and n corresponding data outputs, each latch bock supplied with said latch pulses and supplied in parallel with said shift data such that an i-th bit output(i is a natural number from 1 to m) on an i-th data output of each of aid n shift resistor blocks is supplied to an i-th latch block through one of said data inputs thereof, and each of aid latch blocks latching said supplied shift data on said outputs thereof in response to an input of said latch pulses:

a gate pulse generating block for generating first to n-th gate pulses during a period of said second clock;

m n:1 selector blocks corresponding to said m latch block is and each of said selector blocks having n inputs and 1 output, i-th inputs of said selector blocks connected to i-th outputs of said corresponding latch blocks, each of said selector blocks supplied with said first to n-th gate pulses and supplied with said latch data of n bit parallel output from said latch blocks, and outputting i-th bit latch data at an i-th gate pulse so as to of generate an n-bit serial data signal.

2. The time-division multiplexing apparatus according to claim 3, wherein a length of wires connecting each of said outputs of said n shift resistor blocks with corresponding inputs of said m latch blocks are set to that output data from said n latches can travel to said corresponding input of said m latches within a time less than 1/f0.

3. A time-division multiplexing apparatus, comprising:

n shift registers, n being a natural number greater than two, each shift register having a data input, a clock input, and m data outputs for different level bits, m being a natural number less than n;

a first clock signal generator connected to the clock input of each shift register;

m latches, each latch having n data inputs, a clock input, and n data outputs, each latch having each of said n data inputs thereof connected to a same level bit output of each of said n shift registers;

a second clock signal generator connected to the clock input of each of said m latches;

m selectors corresponding to said m latches, each selector having n data inputs corresponding to said n data outputs of said corresponding latch, at least one clock input, and at least one data output, each of said n data inputs of each of said m selectors connected the corresponding input of the corresponding latch; and a third clock signal generator for generating a third clock signal, connected to said at least one clock input of each of said m selectors.

4. A time-division multiplexing apparatus, according to claim 3, wherein:

said first clock signal generator generates a clock signal having a frequency of f0;

said second clock signal generator generates a clock signal having a frequency of f0/m; and said third clock signal generator generates a clock signal having n gate pulses within a period of f0/m.

5. A time-division multiplexing apparatus, according to claim 4, wherein:

each of the said at least on data outputs of said m selectors consists of one output.

6. A time-division multiplexing apparatus according to claim 4, wherein the connections between the latches and selectors are made by first wires of substantially a same length and the connections between the shift registers and latches are made by second wires which do not differ in length by more than (1/f0)*V, where V is a velocity of signals transmitted through said second wires.

7. A time-division multiplexing apparatus, comprising:

n shift register means, n being a natural number greater than two, each shift register means having a data input, a clock input, and m data outputs of a different bit level, m being a natural number, each shift register means inputting m bits of serial data nd outputting one bit on each of said m data outputs in response to a first clock signal transmitted to said clock input;

m latch means, each latch means having n data inputs, a clock input, and n data outputs corresponding to said n data inputs thereof, said n data inputs of each of said latch means corresponding a same bit level data in output of each of said latch means, each latch means having each of said n data inputs thereof connected to said corresponding data output of said n shift registers means, each of said latch means outputting latch signals on said data outputs corresponding to input signal on the corresponding input thereof in response to a second clock signal which is connected to the clock input of each of said m latch means;

m selector means corresponding to said m latch means each selector having n data inputs corresponding to said n data outputs of said corresponding latch means, at least one clock input, and at least one data output, each of said n data inputs of each of said m selector means connected to the corresponding input of the corresponding latch means, wherein when each latch means outputs said latch signal on said data outputs connected to said corresponding inputs of said selector means, said latch signals re serially output on the data output of said each selector means in response to a third clock signal transmitted to each of said selector means.

8. A time-division multiplexing appartus according to claim 7, wherein m<n.

9. A time-division multiplexing appartus according to claim 8, wherein the connections between the latch means and selector means re made by first wires of substantially a same length and the connections between the shift register means and the latch means re made by second wires which do not different in length more than (1/fO*V, where fO is a frequency of the first clock signal and V is a velocity of signals through said second wires.

10. A time-division multiplexing apparatus, according to claim 8, further comprising:

said first clock signal generator for generating a clock signal having a frequency of fO as the first clock signal;

said second clock signal generator for generating a clock signal having a frequency of fO/m as the second clock signal; and said third clock signal generator for generating a clock signal having n gate pulses within a period of fO/m as the third clock signal.

* * * * *